US007949960B2

(12) United States Patent
Roessler et al.

(10) Patent No.: US 7,949,960 B2
(45) Date of Patent: May 24, 2011

(54) PREDICTIVE RENDERING OF USER INTERFACES

(75) Inventors: Andreas Roessler, Sulzfeld (DE); Malte Wedel, Heidelberg (DE)

(73) Assignee: SAP AG, Walldorf (DE)

( * ) Notice: Subject to any disclaimer, the term of this patent is extended or adjusted under 35 U.S.C. 154(b) by 968 days.

(21) Appl. No.: 10/676,846

(22) Filed: Sep. 30, 2003

(65) Prior Publication Data

US 2005/0071777 A1 Mar. 31, 2005

(51) Int. Cl.
*G06F 3/048* (2006.01)
(52) U.S. Cl. ......... 715/812; 715/745; 715/811; 715/822
(58) Field of Classification Search ................ 715/810, 715/812, 825, 841, 744, 745, 811, 813, 822
See application file for complete search history.

(56) References Cited

U.S. PATENT DOCUMENTS

| | | | | |
|---|---|---|---|---|
| 5,727,129 A * | 3/1998 | Barrett et al. | ........ | 706/10 |
| 5,758,087 A * | 5/1998 | Aaker et al. | ........ | 709/232 |
| 5,765,154 A * | 6/1998 | Horikiri et al. | ........ | 707/10 |
| 5,802,292 A * | 9/1998 | Mogul | ........ | 709/203 |
| 6,055,569 A * | 4/2000 | O'Brien et al. | ........ | 709/223 |
| 6,067,565 A * | 5/2000 | Horvitz | ........ | 709/218 |
| 6,085,226 A * | 7/2000 | Horvitz | ........ | 709/203 |
| 6,154,767 A * | 11/2000 | Altschuler et al. | ........ | 709/203 |
| 6,178,461 B1 * | 1/2001 | Chan et al. | ........ | 709/247 |
| 6,182,133 B1 * | 1/2001 | Horvitz | ........ | 709/223 |
| 6,311,197 B2 * | 10/2001 | Mighdoll et al. | ........ | 715/201 |
| 6,323,884 B1 * | 11/2001 | Bird et al. | ........ | 715/810 |
| 6,377,972 B1 * | 4/2002 | Guo et al. | ........ | 709/201 |
| 6,584,498 B2 * | 6/2003 | Nguyen | ........ | 709/219 |
| 6,742,033 B1 * | 5/2004 | Smith et al. | ........ | 709/224 |
| 6,769,019 B2 * | 7/2004 | Ferguson | ........ | 709/219 |
| 7,003,566 B2 * | 2/2006 | Codella et al. | ........ | 709/224 |
| 7,058,691 B1 * | 6/2006 | Yu et al. | ........ | 709/207 |
| 7,082,454 B1 * | 7/2006 | Gheith | ........ | 709/203 |
| 7,155,489 B1 * | 12/2006 | Heilbron et al. | ........ | 709/217 |
| 7,331,038 B1 * | 2/2008 | Snodgrass et al. | ........ | 717/123 |
| 7,558,822 B2 * | 7/2009 | Fredricksen et al. | ........ | 709/203 |
| 7,590,631 B2 * | 9/2009 | Rail | ........ | 1/1 |
| 7,716,569 B2 * | 5/2010 | Ran et al. | ........ | 715/207 |
| 2002/0015042 A1 * | 2/2002 | Robotham et al. | ........ | 345/581 |
| 2002/0165925 A1 * | 11/2002 | Hamilton et al. | ........ | 709/213 |
| 2003/0063072 A1 * | 4/2003 | Brandenberg et al. | ........ | 345/173 |

* cited by examiner

*Primary Examiner* — Ba Huynh
(74) *Attorney, Agent, or Firm* — Finnegan, Henderson, Farabow, Garrett & Dunner, L.L.P.

(57) ABSTRACT

Methods and apparatus, including computer program products, implement techniques for rendering the user interface of a software application. A client computer provides a user interface for a computer program application. The user interface is operable to receive input from a user interacting with the client and to generate user interaction events from the input. One or more possible user interaction events are identified on the client while the user interface is in a current user interface state. The possible user interaction events are user interaction events that would arise from input the user interface could possibly receive in the current user interface state from the user. One or more of the possible user interaction events are pre-processed to generate one or more possible user interface states. The possible user interface states are stored for later use.

16 Claims, 6 Drawing Sheets

PREDICTIVE RENDERING OF USER INTERFACES

BACKGROUND

The present invention relates to data processing by digital computer, and more particularly to rendering the user interface of a software application.

Some applications implement user interfaces (UIs) in a client program, e.g., a Web browser, running in a client-server architecture. The UIs typically include controls operable by a user to interact with the applications. Controls can include buttons, pop-up menus, pull-down menus, dialog boxes, scroll bars, and any other controls that enable the user to view application data, invoke application functionality, and otherwise interact with an application. Each control has an associated control state, and the user interface has an associated UI state. The control states and the UI state can change based on user interaction. A visual representation of the user interface is generated by rendering the associated UI state. The process of rendering the UI state can include generating a data structure, e.g., an HTML-DOM (Hypertext Markup Language—Document Object Model) tree that represents the UI state.

User interaction with the controls can cause a change in the control states and the UI state. Typically, a new visual representation for the user interface is generated whenever the user changes to a new UI state by interacting with the controls.

SUMMARY OF THE INVENTION

In general, in one aspect, the invention provides methods and apparatus, including computer program products, for rendering the user interface of a software application. A user interface for a computer program application is provided on a client computer, where the user interface is operable to receive input from a user interacting with the client and to generate user interaction events from the input. One or more possible user interaction events are identified on the client while the user interface is in a current user interface state. The possible user interaction events are user interaction events that would arise as a result of input from the user that the user interface could possibly receive in the current user interface state. One or more of the possible user interaction events are pre-processed to generate one or more possible user interface states, and the possible user interface states are stored for later use.

Advantageous implementations of the invention include one or more of the following features. An actual input can be received from the user, and if one of the possible user interface states corresponds to a user interaction event that arises from the actual input from the user, the corresponding one of the possible user interface states is made the current user interface state. One or more of the possible user interface states can be pre-rendered to generate one or more possible user interface appearances, and the possible user interface appearances can be stored for later use. The possible user interface states can include instructions to generate code to render the corresponding user interface states. The code to render the corresponding user interface states can include HTML (Hypertext Markup Language) code. An actual input can be received from the user, and if one of the possible user interface states corresponds to a user interaction event that arises from the actual input from the user, the corresponding one of the possible user interface appearances is made the user interface appearance of the current user interface state. An order for pre-processing the possible user interaction events can be specified. Specifying an order for pre-processing possible user interaction events can include estimating the likelihood of the one or more possible user interaction events based on an estimate of the likelihood of different inputs from the user that the user interface could possibly receive in the current user interface state. The user interface can include a control that establishes estimates of the likelihood of generating possible user interaction events from user interaction with the control, and the instructions to estimate the likelihood of the one or more possible user interaction events can include using the estimates established by the control. The identification and pre-processing of possible user interaction events can be started only after a period of inactivity is detected. Pre-processing the possible user interaction events to generate one or more possible user interface states can include obtaining data from the application for the possible user interface states. The possible user interaction events that are identified can include only those possible user interaction events having an estimated likelihood of occurrence exceeding a threshold. The computer program application can be a program running on a server computer in data communication with the client computer, and the client computer can provide the user interface in a Web browser.

In another aspect, the invention provides an apparatus including a client computer implementing a user interface for a computer program application, means for identifying one or more possible user interaction events while the user interface is in a current user interface state, means for pre-processing one or more of the possible user interaction events to generate one or more possible user interface states, and means for storing the one or more possible user interface states for later use. The user interface is operable to receive input from a user interacting with the client and to generate user interaction events from the input. The possible user interaction events are user interaction events that would arise from input the user interface could possibly receive in the current user interface state from the user.

Advantageous implementations of the invention include one or more of the following features. The apparatus can include means for receiving an actual input from the user. If one of the possible user interface states corresponds to a user interaction event that arises from the actual input from the user, the corresponding one of the possible user interface states can be made the current user interface state. The apparatus can include means for a pre-rendering one or more of the possible user interface states to generate one or more possible user interface appearances, and means for storing the one or more possible user interface appearances for later use. The apparatus can include means for specifying an order for pre-processing the possible user interaction events.

The invention can be implemented to realize one or more of the following advantages. Changes to UIs (i.e., transitions to new UI states) can be processed and displayed quickly. This can reduce any "flickering" effect in the visual representation that can result from a delay in generating and rendering a new UI state. Applications appear to run smoothly and responsively, and developers can implement applications having a high degree of interactivity. Rules for when to generate pre-processed results can be adjusted, e.g., by raising or lowering the probability threshold for when to pre-process a possible user interaction event state, so as to strike an appropriate balance between computational effort and gains in performance. One implementation of the invention provides all of the above advantages.

The details of one or more implementations of the invention are set forth in the accompanying drawings and the

BRIEF DESCRIPTION OF THE DRAWINGS

Like reference numbers and designations in the various drawings indicate like elements.

DETAILED DESCRIPTION

Figure 1:
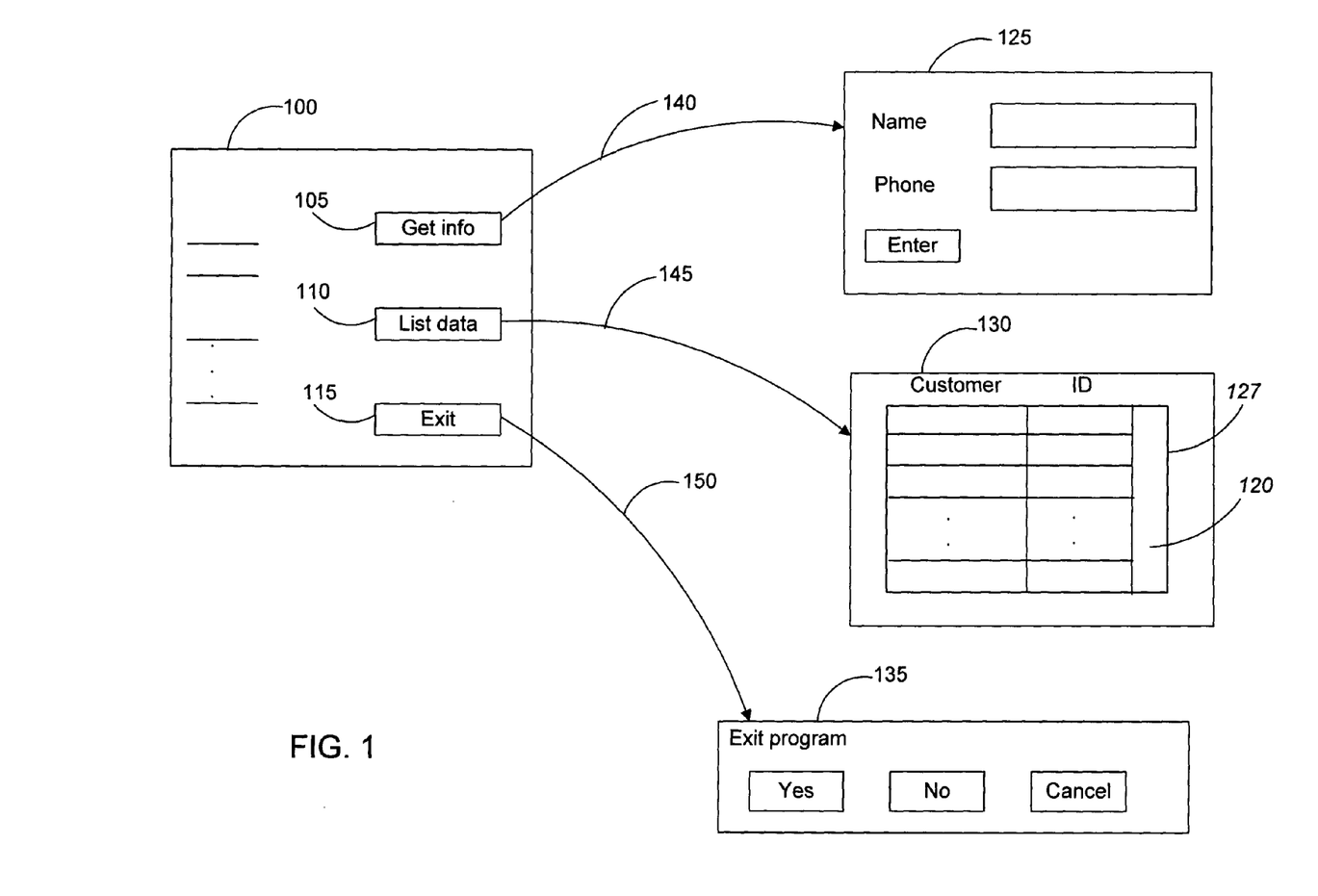
FIG. 1 illustrates UI state transitions of an exemplary application.

FIG. 1 illustrates UI state transitions for the user interface of an example computer program application based on user interaction. The user interface has a UI state 100 that includes three controls—105, 110, and 120. Each of the controls 105, 110, and 120 has a control state that includes a view state and a data state. The visual properties of a control define the view state of the control. Examples of visual properties include the visibility of a tray control (e.g., expanded or collapsed), the scroll position of a table control, or the selection state of a button control. Data associated with a control defines the data state of the control. The data can include different types of data including strings, booleans, or objects (e.g., Java.util.date objects). The UI state for the user interface includes the control states of all the application controls. If one of the control states for a control in the user interface changes, the user interface transitions to a new UI state. In this example, the user interacts with control 105 to add new customer records, with control 110 to list existing customer records, and with control 115 to exit the application.

User interaction with a control can generate a user interaction event and the user interface can transition to a new UI state based on the generated user interaction event. User interaction events can change the state of a control, as well as the UI state for the user interface. The user interface has one or more possible user interaction events and one or more possible UI states. Each possible UI state is generally associated with at least one possible user interaction event. The possible user interaction events are user interaction events that would be generated as a result of user input received by the user interface while the user interface is in a current user interface state. For example, if the current user interface state includes a button and a pull-down menu, the possible user interaction events include pressing the button and selecting events each selecting an item from the pull-down menu. In the example application of FIG. 1, there are three possible user interaction events for UI state 100, 140, 145, and 150 that would be generated as a result of user interaction with the controls 105, 110, and 115, respectively. The possible user interaction events 140, 145, and 150 generate possible user interface states 125, 130, and 135, respectively.

Possible user interaction events generated as a result of user interaction with scroll bar 120 to scroll down a table of entries 127 result in possible UI states which may require (among other things) obtaining additional data from the application (e.g., additional rows of data to be displayed in the table), rendering the additional data, and rendering the new state of the controls (e.g., a scroll bar indicating a lower position).

Conventionally, new UI states are generated only after a user interaction event causing a transition to the new UI state is actually received. The performance of the application can be improved, however, by identifying possible user interaction events, and pre-processing the possible user interaction events to generate the possible UI states. Generating the possible UI state can include generating the possible control state, including the view state and the data state, for each control affected by the possible user interaction events. Each possible UI state corresponds to at least one pre-processed possible user interaction event.

Figure 2:
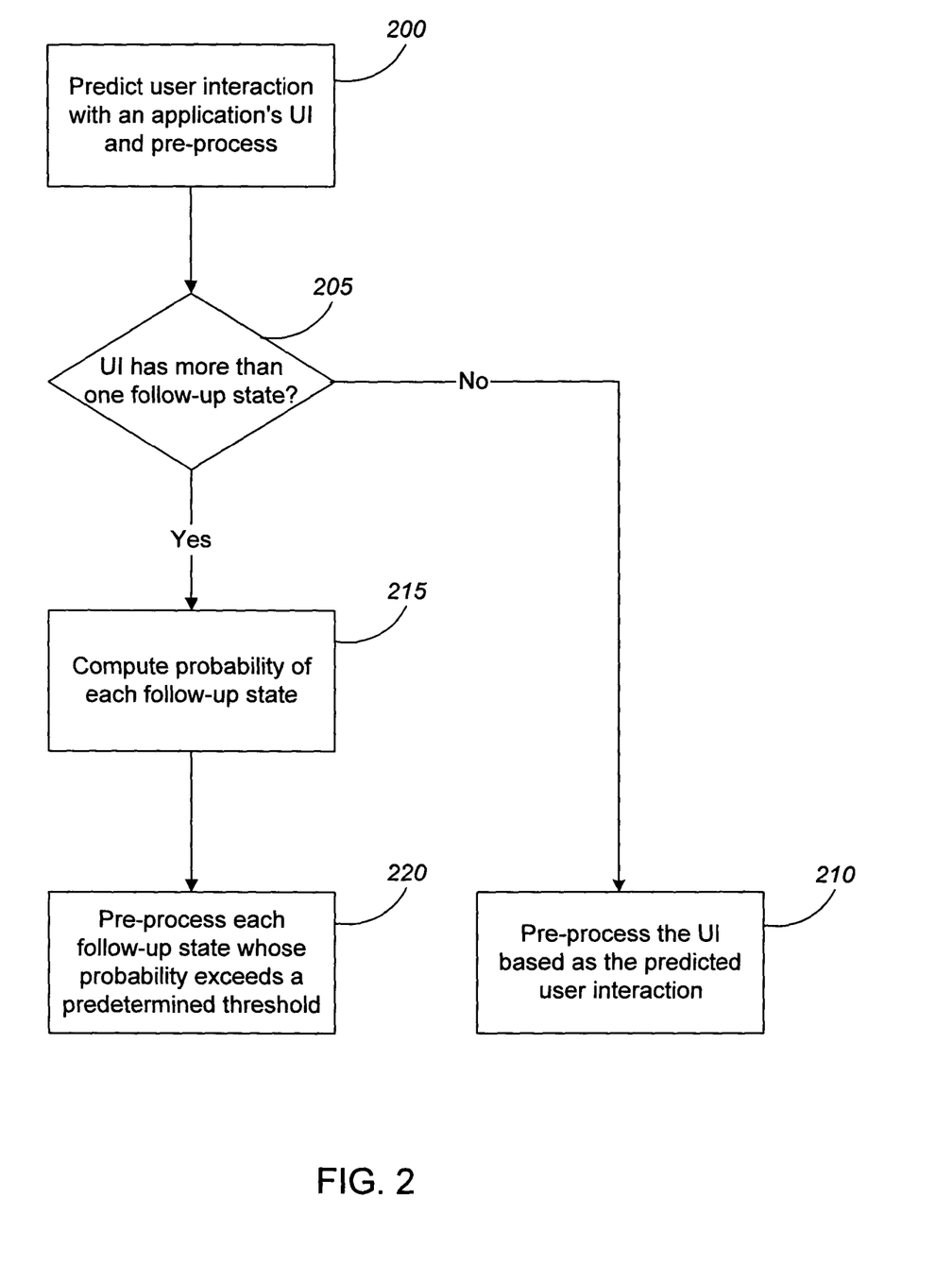
FIG. 2 is a flow diagram illustrating identifying and pre-processing possible user interaction events.

FIG. 2 is a flow diagram illustrating a method for pre-processing user interaction events for a current UI state of a user interface. One or more possible user interaction events for the current UI state are identified (step 200). The possible user interaction events are user interaction events that would be generated as a result of user input received by the user interface in the current UI state. The possible user interaction events are pre-processed to generate the possible UI states (step 205), and the possible UI states are stored for later use (step 210). In addition to storing the possible UI states in step 210, one or more of the possible UI states can be pre-rendered to generate possible user interface appearances, and the possible user interface appearances can be stored for later use. Pre-rendering a possible UI state can include generating code to render the possible UI state, or generating an HTML-DOM representation of the possible UI state.

The possible user interaction events in step 200 are generated based on how a user is expected to interact with the application user interface. Each possible user interaction event arises from input the user interface could possibly receive in the current user interface state. The possible user interaction events can be ordered using a specified ordering scheme, and pre-processed in the specified order. The specified order can be based on an estimated likelihood of the possible user interaction events, based on the estimated likelihood of user inputs received by the user interface in the current user interface state. The estimated likelihood of user inputs can be assigned at runtime, e.g., by the application or by a framework executing the application. The estimated likelihood of user inputs (the probability of occurrence) can also be assigned at design time, e.g., by an application user interface developer or by a user as part of customizing the application user interface. The probability of occurrence of the user inputs can be modified based on a history of user inputs, e.g., if the history of user inputs indicates that a particular user input is never received then that user input can be assigned a zero probability of occurrence.

In one implementation, all UI controls currently displayed by the application are assigned an equal probability of occurrence. In an alternative implementation, the probability of occurrence is set to zero for UI controls that are never predicted and pre-processed. For example, the application user interface developer, or the user, can specify controls that should not be predicted. The assigned probability of occurrence for each predicted user interaction event can be modified at runtime based on user interaction with the application user interface. For example, if the current UI state includes only one button, the predicted user interaction event consisting of the user selecting the button is assigned a probability of "1". In another example, the probability of occurrence is increased for UI elements in a particular group of controls, if the user is currently interacting with the UI controls in that group.

Figure 3:
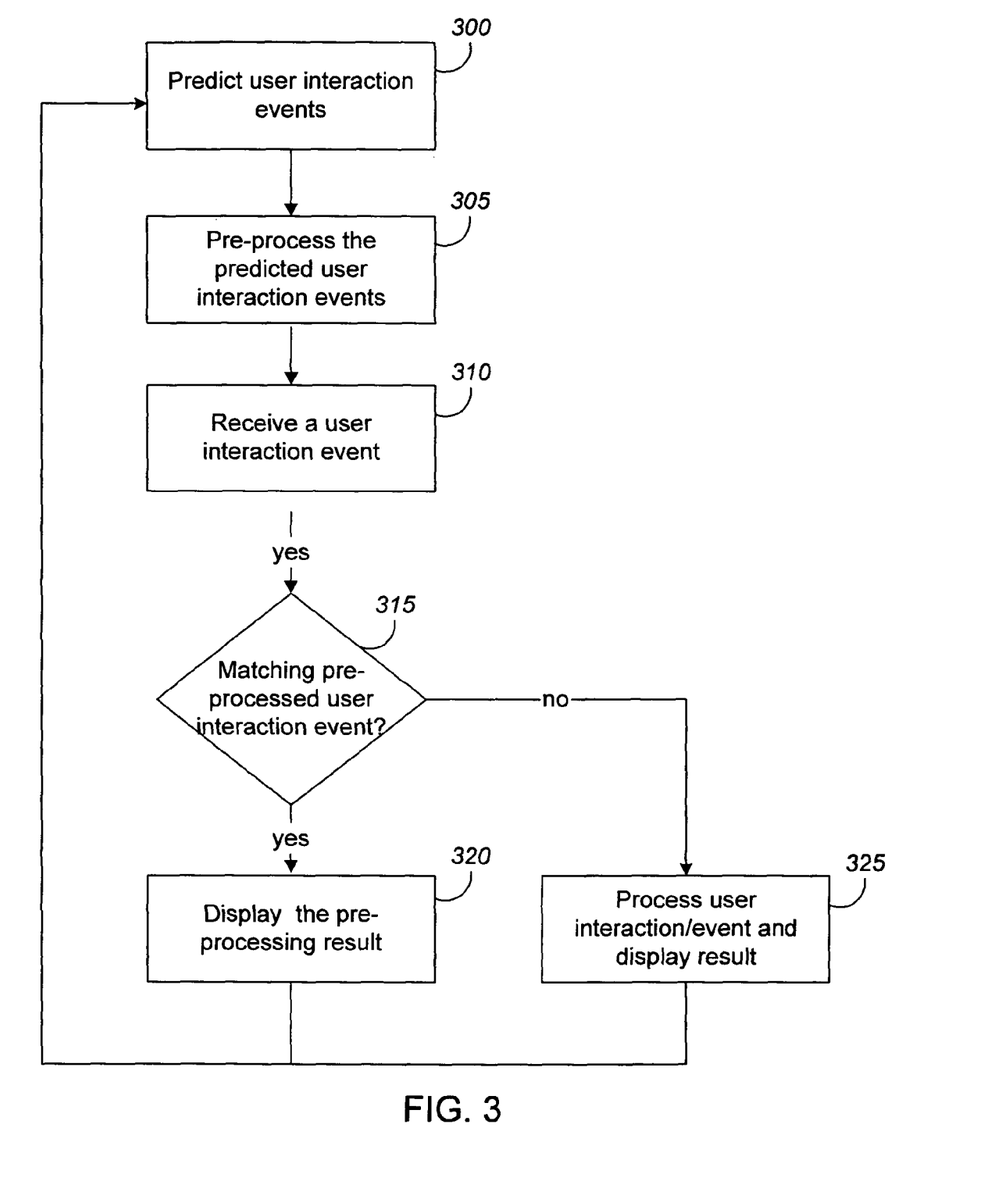
FIG. 3 is a flow diagram illustrating rendering of a user interface based on preprocessing possible user interaction events.

FIG. 3 illustrates the rendering of a user interface based on pre-processing possible user interaction events in accordance with another aspect of the invention. One or more user interaction events for the user interface are identified as possible user interaction events (step 300). The possible user interaction events are based on how a user can be expected to interact with the controls in the user interface. The possible user interaction events are each pre-processed to generate the possible UI state that the application will transition to for each of the possible user interaction events (step 305). The possible UI states for the possible user interaction events are generated and stored without being displayed.

The pre-processing in step 305 continues until all the possible user interaction events have been pre-processed or until the application must respond to an external event. After an actual user interaction event is received (step 310), the method determines if the received user interaction event matches one of the pre-processed user interaction events (step 315). If so ("yes" branch of decision step 315), the possible UI state corresponding to the received user interaction event is retrieved and displayed (step 320). In one implementation, where only pre-processed UI states are stored for the possible user interaction events, the pre-processed UI state corresponding to the received user interaction event is retrieved and rendered prior to displaying the pre-processed UI state. In an alternative implementation, where the pre-rendered UI states are stored for the possible user interaction events, the pre-rendered UI state corresponding to the received user interaction event is retrieved and displayed. If the received user interaction event does not match one of the pre-processed user interaction events ("no" branch of decision step 315), the received user interaction event is processed to generate and render the resulting UI state (step 325). After displaying the UI state resulting from the user interaction event, the method restarts at step 300.

In one implementation, the pre-processing of possible user interaction events in step 305 is started only if no external events have been received for a predefined time interval. External events are events not initiated by the application, e.g., actual user interaction events, system generated events, and server generated events in a client-server architecture. The pre-processing of possible user interaction events continues until an actual user interaction event is received or until all the possible user interaction events have been pre-processed. The pre-processing of possible user interaction events can also be interrupted whenever an external event is received.

Figure 4:
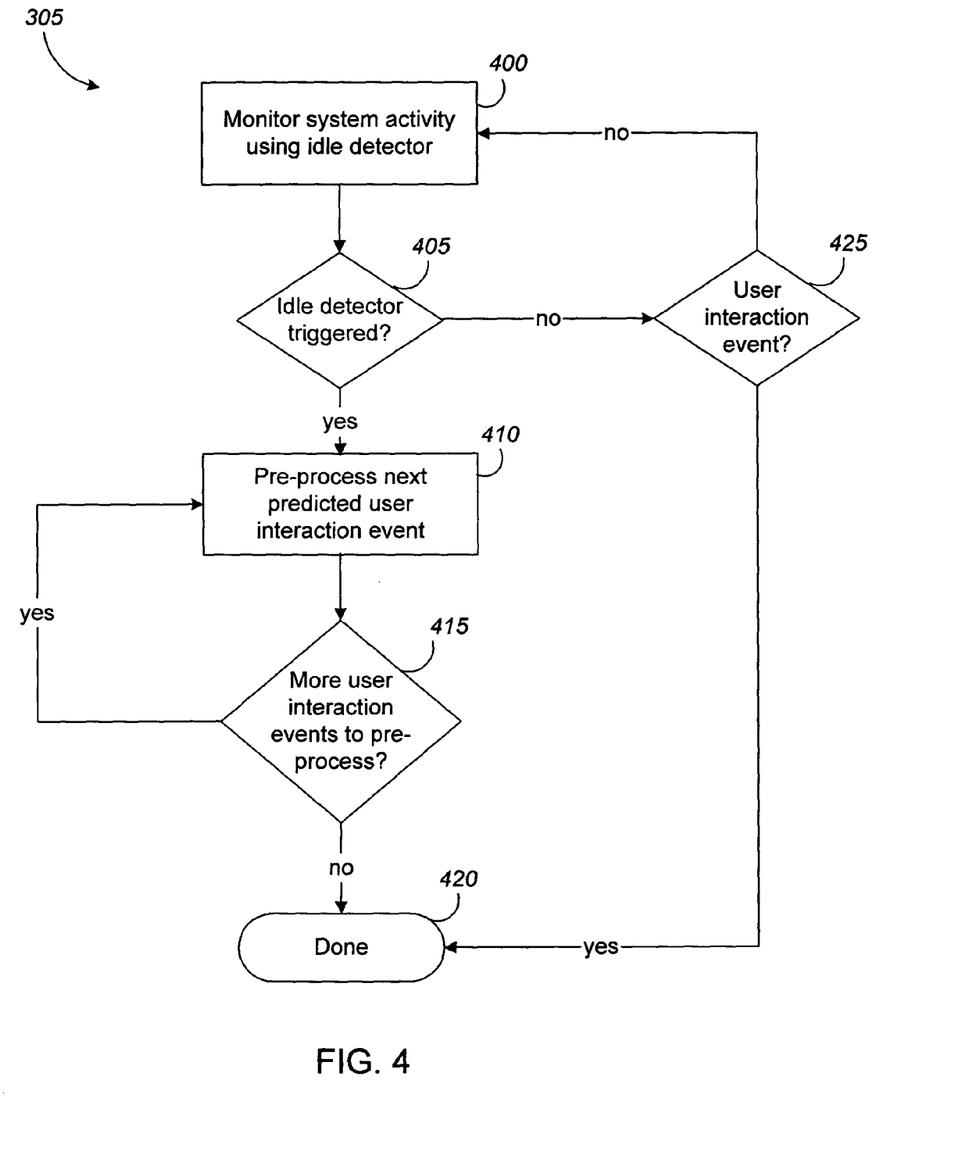
FIG. 4 is a flow diagram illustrating pre-processing possible user interaction events.

FIG. 4 is a flow diagram illustrating pre-processing possible user interaction events (step 305). The method monitors system activity using an idle detector (step 400). If an idle detector is not triggered (step 405) the system checks for a user interaction event (step 425). If no user interaction event is found, the system returns to monitoring system activity using an idle detector (step 400). If a user interaction event is found, the system is done monitoring system activity using an idle detector (step 420). If an idle detector is triggered (step 405), the next predicted user interaction event is pre-processed (step 410). Next, the system checks to see if there are more user interaction events to pre-process (step 415). If there are more user interaction events to pre-process, the next predicted user interaction event is pre-processed (step 410). If there are no more user interaction events to pre-process, system activity monitoring using an idle detector is done (step 420).

Figure 5:
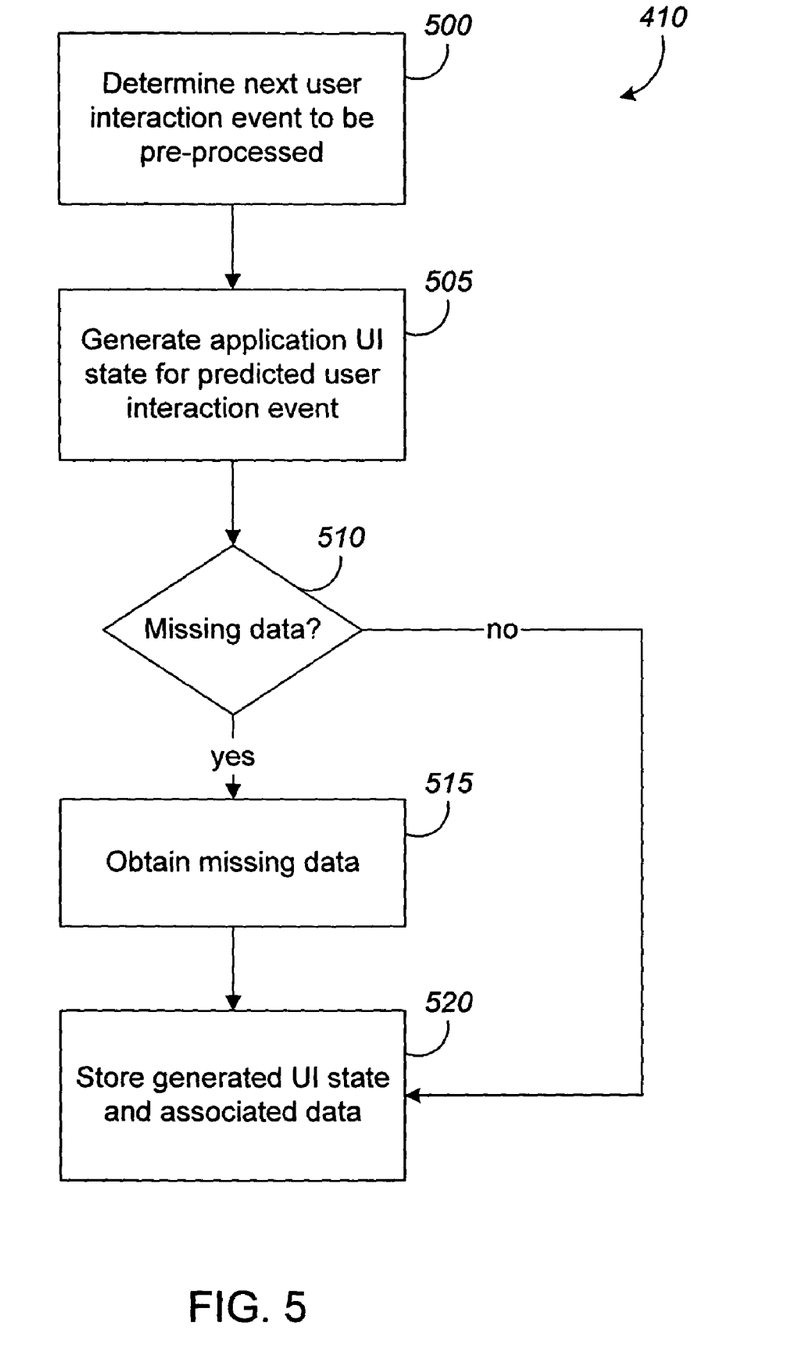
FIG. 5 is a flow diagram illustrating further pre-processing.

FIG. 5 is a flow diagram illustrating a method for pre-processing the possible user interaction events (step 305, FIG. 3). The method identifies a possible user interaction event to be pre-processed (step 500), and generates the possible UI state corresponding to the possible user interaction event (step 505). The generated possible UI state can have associated data that is required to render the generated possible UI state. If there is no missing data in step 510, the generated possible UI state and associated data are stored (step 520). In one implementation, the generated possible UI state and the associated data are used to pre-render an appearance of the generated possible UI state and the pre-rendered appearance is stored in step 520. In another implementation, the associated data required to render the generated possible UI state is not obtained during pre-processing; instead, the associated data is obtained when the generated possible UI state has to be rendered (step 320, FIG. 3). If there is missing data (step 510), the missing data is obtained (step 515) and the generated UI state and associated data are stored (step 520). In an alternative implementation, where the application is running on a client in a client-server architecture, the application obtains the associated data from the server in step 515.

Figure 6:
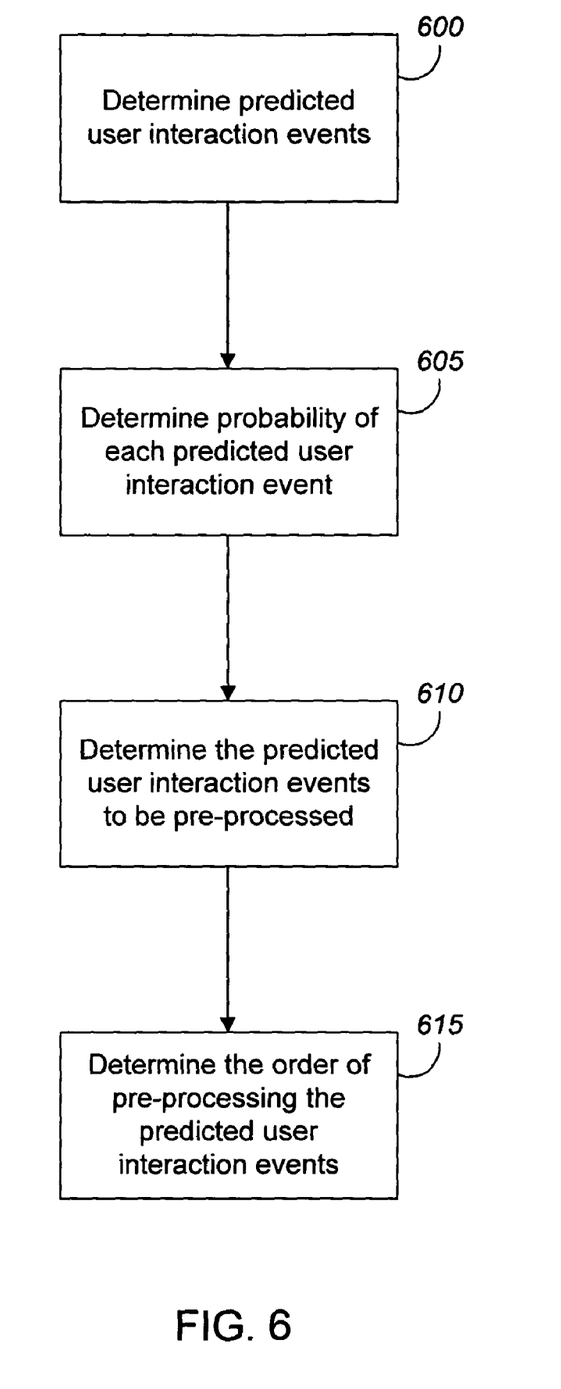
FIG. 6 is a flow diagram illustrating a method for determining an order for pre-processing.

FIG. 6 is a flow diagram illustrating a method for determining an order for preprocessing. A first step determines predicted user interaction events (step 600). The probability of each predicted user interaction event is determined (step 605). Next, the predicted user interaction events to be pre-processed are determined (step 610). Finally, the order of pre-processing the predicted user interaction events is determined (step 615).

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer program product, tangibly embodied in a non-transitory computer-readable storage medium, comprising instructions operable on a computer to:
   provide a user interface for a computer program application, the user interface being operable to receive input from a user interacting with controls in the user interface and, from the input, to generate user interaction events;
   identify one or more future user interaction events that may occur while the user interface is in a current user interface state, the current user interface state comprising one or more controls enabling user input, the controls comprising one or more current properties;
   estimate a likelihood for the future user interaction events to occur based on a history of previous user inputs to the user interface;
   select one or more of the future user interaction events to pre-process based on the estimated likelihoods that the future user interaction events will occur;
   pre-process, while the user interface is in the current user interface state, the selected future user interaction events to generate one or more future user interface states, the future user interface states comprising one or more future properties of the controls in the current user interface state;
   pre-render, while the user interface is in the current user interface state, future user interface appearances corresponding to the generated future user interface states; and
   store the pre-rendered future user interface appearances for later use.

2. The product of claim 1, further comprising instructions to:
   receive an actual input from the user and, if a first one of the future user interface states corresponds to the actual input, display the future user interface appearance corresponding to the first user interface state.

3. The product of claim 2, further comprising instructions to generate code to render the first user interface state.

4. The product of claim 3 wherein the code to render the first user interface state comprises HTML (Hypertext Markup Language) code.

5. The product of claim 1, further comprising instructions to:
   specify an order for pre-processing the future user interaction events based on the estimated likelihoods that the future user interaction events will occur.

6. The product of claim 1, wherein:
   the user interface comprises instructions to establish the estimated likelihoods for the future user interaction events.

7. The product of claim 1, wherein:
   the instructions to pre-process the selected future user interaction events comprise instructions to obtain data from the computer program application for the generated future user interface states.

8. The product of claim 1, wherein each of the selected future user interaction events has estimated likelihoods of occurrence exceeding a threshold probability, and the future user interaction events other than the selected future user interaction events have estimated likelihoods that do not exceed the threshold probability.

9. The product of claim 8, further comprising instructions for raising or lowering the threshold probability.

10. The product of claim 1, wherein:
    the computer program product is a program running on a server computer in data communication with a client computer; and
    the instructions to provide a user interface comprise instructions to provide the user interface in a Web browser.

11. A computer-implemented method, comprising the steps implemented by one or more computers of:
    providing, by the one or more computers, a user interface for a computer program application, the user interface being operable to receive input from a user interacting with controls in the user interface and, from the input, to generate user interaction events;
    identifying, by the one or more computers, one or more future user interaction events that may occur while the user interface is in a current user interface state, the current user interface state comprising one or more controls enabling user input, the controls comprising one or more current properties;
    estimating, by the one or more computers, a likelihood for the future user interaction events to occur based on a history of previous user inputs to the user interface;

selecting, by the one or more computers, one or more of the future user interaction events to pre-process based on the estimated likelihoods that the future user interaction events will occur;

pre-processing, by the one or more computers and while the user interface is in the current user interface state, the selected future user interaction events to generate one or more future user interface states, the future user interface states comprising one or more future properties of the controls in the current user interface state;

pre-rendering, by the one or more computers and while the user interface is in the current user interface state, future user interface appearances corresponding to the generated future user interface states; and storing, by the one or more computers, the pre-rendered future user interface appearances for later use.

12. The method of claim 11, further comprising:
receiving an actual input from the user and, if a first one of the future user interface states corresponds to the actual input, displaying the future user interface appearance corresponding to the first user interface state.

13. The method of claim 11, further comprising:
specifying an order for pre-processing the future user interaction events based on the estimated likelihoods that the future user interaction events will occur.

14. An apparatus, comprising:
a processor for executing program instructions; and
a computer-readable storage medium storing the program instructions, the program instructions, when executed by the processor, performing a process comprising:
providing a user interface for a computer program application, the user interface being operable to receive input from a user interacting with controls in the user interface and, from the input, to generate user interaction events;

identifying one or more future user interaction events that may occur while the user interface is in a current user interface state, the current user interface state comprising one or more controls enabling user input, the controls comprising one or more current properties;

estimating a likelihood for the future user interaction events to occur based on a history of previous user inputs to the user interface;

selecting one or more of the future user interaction events to pre-process based on the estimated likelihoods that the future user interaction events will occur;

pre-processing, while the user interface is in the current user interface state, the selected future user interaction events to generate one or more future user interface states, the future user interface states comprising one or more future properties of the controls in the current user interface state;

pre-rendering, while the user interface is in the current user interface state, future user interface appearances corresponding to the generated future user interface states; and storing the pre-rendered future user interface appearances for later use.

15. The apparatus of claim 14, the process further comprising:
receiving an actual input from the user and, if a first one of the future user interface states corresponds to the actual input, displaying the future user interface appearance corresponding to the first user interface state.

16. The apparatus of claim 15, the process further comprising:
specifying an order for pre-processing the future user interaction events based on the estimated likelihoods that the future user interaction events will occur.

* * * * *